(12) United States Patent
Marjelund et al.

(10) Patent No.: US 7,106,704 B2
(45) Date of Patent: Sep. 12, 2006

(54) METHOD FOR MANAGING PHYSICAL RESOURCES OF A RADIO ACCESS NETWORK

(75) Inventors: Pekka Marjelund, Espoo (FI); Jari Hartikainen, Kerava (FI)

(73) Assignee: Nokia Corporation, Espoo (FI)

( * ) Notice: Subject to any disclaimer, the term of this patent is extended or adjusted under 35 U.S.C. 154(b) by 229 days.

(21) Appl. No.: 09/902,027

(22) Filed: Jul. 10, 2001

(65) Prior Publication Data

US 2002/0105906 A1 Aug. 8, 2002

Related U.S. Application Data

(63) Continuation of application No. PCT/EP99/00124, filed on Jan. 12, 1999.

(51) Int. Cl.
*H04B 7/00* (2006.01)
(52) U.S. Cl. .................... 370/310.1; 370/236.1; 370/278; 370/252
(58) Field of Classification Search ............. 370/310.1, 370/310.2, 328, 329, 335, 348, 338, 230, 370/231, 395.1, 395.21, 395.4, 468, 236.1, 370/397, 412, 232, 236, 255, 230.1, 392, 370/256, 414, 237, 356, 354, 233, 588, 388, 370/235, 395.2, 252, 236.2, 241.1, 278
See application file for complete search history.

(56) References Cited

U.S. PATENT DOCUMENTS

| | | | | |
|---|---|---|---|---|
| 5,742,594 A | * | 4/1998 | Natarajan | 370/336 |
| 5,787,080 A | * | 7/1998 | Hulyalkar et al. | 370/310.2 |
| 5,790,534 A | * | 8/1998 | Kokko et al. | 370/335 |
| 5,953,336 A | * | 9/1999 | Moore et al. | 370/395.43 |
| 5,991,268 A | * | 11/1999 | Awdeh et al. | 370/236.1 |
| 6,011,780 A | * | 1/2000 | Vaman et al. | 370/237 |
| 6,081,505 A | * | 6/2000 | Kilkki | 370/230 |
| 6,157,614 A | * | 12/2000 | Pasternak et al. | 370/236 |
| 6,278,701 B1 | * | 8/2001 | Ayyagari et al. | 370/335 |
| 6,317,598 B1 | * | 11/2001 | Wiesen et al. | 455/443 |
| 6,374,112 B1 | * | 4/2002 | Widegren et al. | 455/452.2 |
| 6,421,335 B1 | * | 7/2002 | Kilkki et al. | 370/342 |
| 6,570,856 B1 | * | 5/2003 | Freeburg et al. | 370/310.1 |
| 6,654,377 B1 | * | 11/2003 | Pasternak et al. | 370/395.4 |
| 6,658,007 B1 | * | 12/2003 | Pasternak et al. | 370/395.4 |
| 6,765,903 B1 | * | 7/2004 | Allen et al. | 370/356 |

FOREIGN PATENT DOCUMENTS

| | | |
|---|---|---|
| EP | 0831669 A2 | 3/1998 |
| WO | WO 98/06203 | 2/1998 |

* cited by examiner

*Primary Examiner*—John Pezzlo
(74) *Attorney, Agent, or Firm*—Squire, Sanders & Dempsey L.L.P.

(57) ABSTRACT

The present invention proposes a method for controlling transmission resources of a radio access network adapted to transmit data packets in real time traffic and in non-real traffic, the method comprising the steps of obtaining information related to transmission resources required for handling real time traffic; and reserving transmission resources for handling non-real time traffic based on a knowledge of the overall available transmission resources of a radio transceiver device of said radio access network and the information related to the transmission resources required for handling real time traffic by said radio transceiver. Transmission resources are subsequently activated based on channel elements which are identified by pre-selected channel element identifiers. This alleviates the use of hitherto required time consuming channel activation procedures as well as the need to refer to any bearer information.

13 Claims, 4 Drawing Sheets

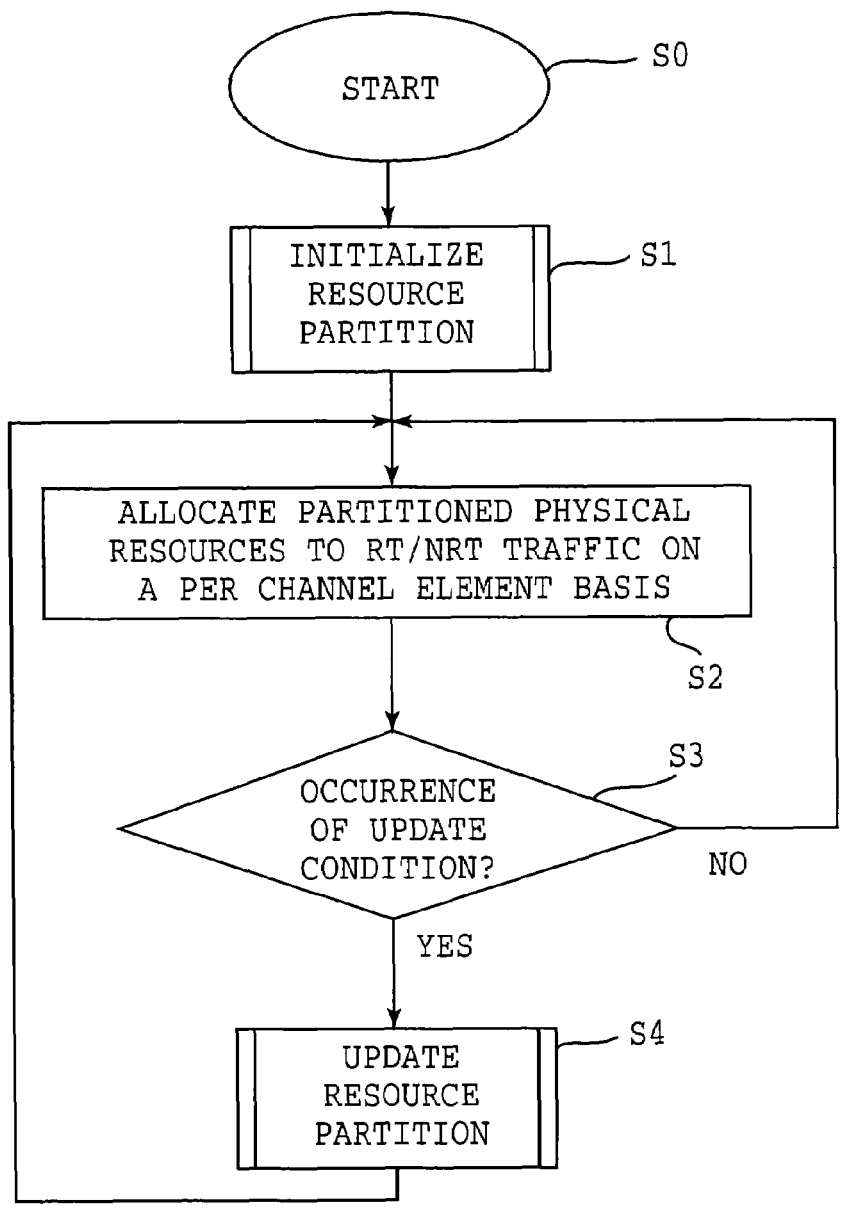

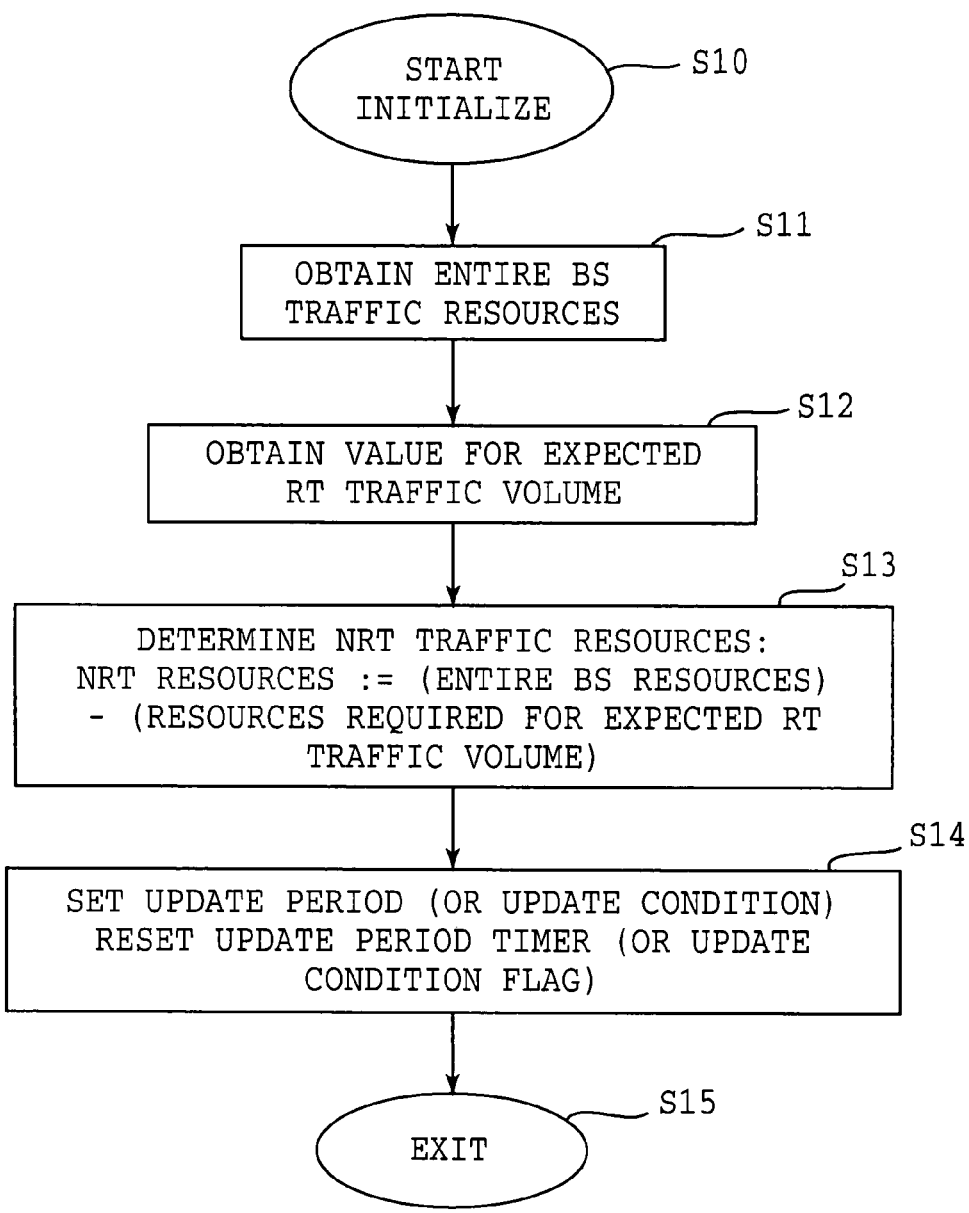

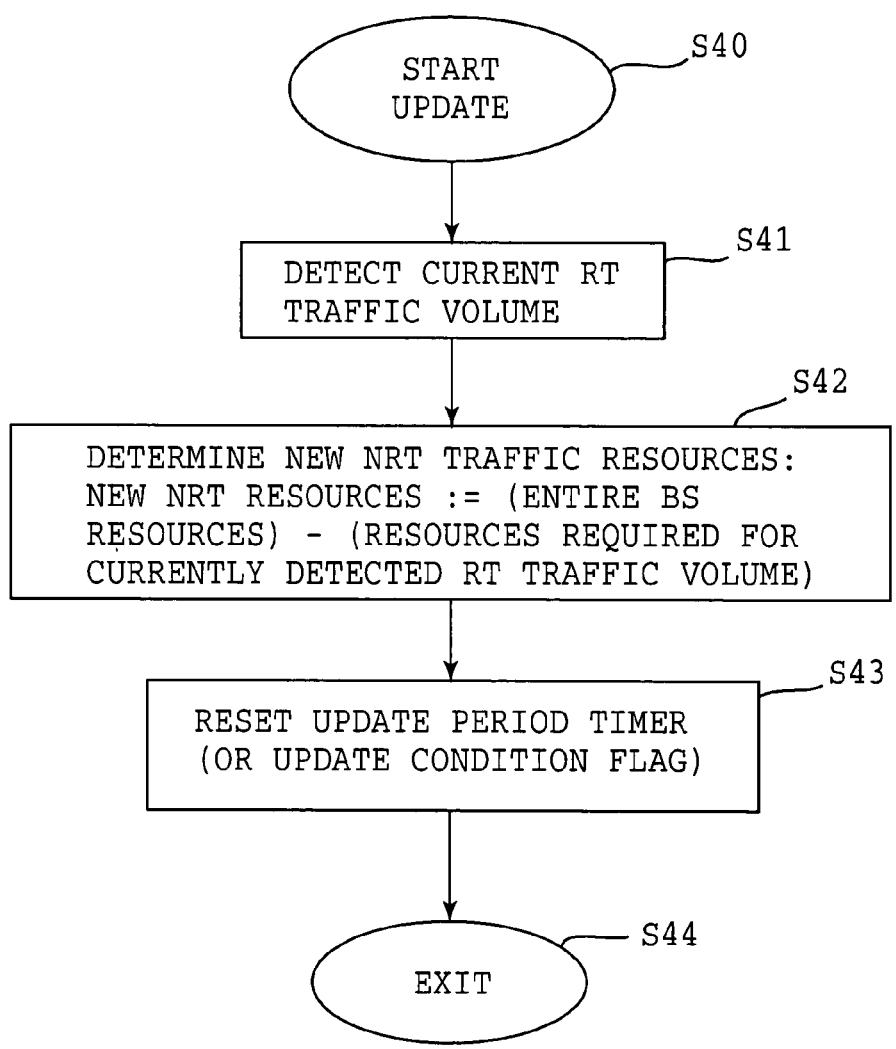

METHOD FOR MANAGING PHYSICAL RESOURCES OF A RADIO ACCESS NETWORK

This application is a continuation of international application serial number PCT/EP99/00124, filed 12 Jan. 1999.

FIELD OF THE INVENTION

The present invention relates to a method for managing physical resources of a radio access network. In particular, the present invention concerns a method for controlling transmission resources of a radio access network capable of transmitting data in units of packets. Also, the present invention concerns such a network which is adapted to transmit data packets in real time traffic and in non-real time traffic.

BACKGROUND OF THE INVENTION

A general block circuit diagram of a radio access network as a part of a radio telecommunication network is shown in FIG. 1.

As is illustrated therein, a terminal device or mobile station MS denoted by reference numeral 3 communicates via an air interface (radio interface) with a radio transceiver device or base station BS denoted by reference numeral 2. It is to be noted that for purposes of a simplified explanation, only one mobile station MS and base station BS, respectively, are shown in FIG. 1, while in practice plural base stations BS constitute a network and each is adapted to communicate with a plurality of mobile stations.

Each of respective base stations BS 2 is controlled by and communicates with a radio network control device or radio network controller RNC denoted by reference numeral 1. Communication between a respective base station BS 2 and the radio network controller RNC 1 takes place via a so-called Iub interface. Via this Iub interface, traffic data or use data respectively, as well as control data are exchanged between the base station BS 2 and the radio network controller RNC 1.

Such networks are meanwhile capable of transmitting data in units of packets (e.g. according to an asynchronous transmission mode ATM). Among the data to be transmitted it can be distinguished between two types of traffic. Firstly, in such a network there exists so-called real time (RT) traffic which is for example due to ongoing phone calls, so that real-time data packets are to be transmitted. Secondly, in such a network there exists so-called non-real time (NRT) traffic which is for example due to files or other data entities to be transmitted, so that non-real time data packets are to be transmitted at scheduled points of time.

Scheduling and/or admitting respective traffic components to be transmitted via the network is handled by an admission control means denoted by 1A as a part of the radio network controller RNC 1. The admission control means 1A is adapted to handle both, real time traffic as well as non-real time traffic.

Hitherto known systems adopt a transmission principle known as code divisional multiple access CDMA or wideband CDMA (WCDMA), according to which physical channels (frequencies) are accessed using different codes. Each used code then represents one channel. A so-called bearer is then defined by a frequency and a used code, for example.

Thus, for transmitting packet data in real time and in non-real time, the entire available physical resources at a base station BS 2 were beforehand divided (partitioned) in real time channels reserved and/or designated for real time traffic and in non-real time channels reserved for non-real time traffic.

Then, in case of data packets to be transmitted in either real time or non-real time, respective channel activation and/or deactivation procedures had to be performed. Such procedures are, however, time consuming which causes a drawback for the data packet allocation functionality in CDMA and/or WCDMA systems, since they had for example to rely on slow common control channels on the Iub interface.

Moreover, due to the beforehand division of channels into real time and non-real time channels, physical resources often remained unused which limited the maximum possible traffic amount handled by the network.

SUMMARY OF THE INVENTION

Hence, it is an object of the present invention to solve the above drawbacks of the prior art systems and to provide a method for controlling transmission resources of a radio access network adapted to transmit data packets in real time traffic and in non-real time traffic which alleviates such time consuming channel activation/deactivation procedures while effectively making use of the entire available physical resources of a respective base station.

According to the present invention, this object is achieved by a method for controlling transmission resources of a radio access network adapted to transmit data packets in real time traffic and in non-real time traffic, the method comprising the steps of obtaining information related to transmission resources required for handling real time traffic, and reserving transmission resources for handling non-real time traffic based on a knowledge of the overall available transmission resources of a radio transceiver device of said radio access network and the information related to the transmission resources required for handling real time traffic by said radio transceiver.

Advantageous further developments of the present invention are as defined in the dependent claims.

The method according to the present invention provides the advantage that the radio network controller RNC 1 does not need to rely on bearer information, i.e. physical channel information like carrier frequency, code and/or time slot (in case of TD-WCDMA). This, in turn, leads to simplified procedures in the network and reduces the management overhead. Moreover, the time consuming and therefore rather slow channel activation/deactivation procedures can be removed, which improves the WCDMA data packet allocation functionality in terms of speed. Moreover, using the proposed method does not cause an increase regarding the amount of data transmitted via the Iub interface.

BRIEF DESCRIPTION OF THE DRAWINGS

The present invention will be more readily understood when referring to the accompanying drawings, in which

FIG. 2 illustrates an overall flowchart of the proposed method;

FIG. 3 illustrates, in form of a flowchart, the individual steps of an initialization subroutine indicated in FIG. 1; and FIG. 4 illustrates, in form of a flowchart, the individual steps of an updating subroutine indicated in FIG. 1.

DETAILED DESCRIPTION OF THE INVENTION

Figure 1:
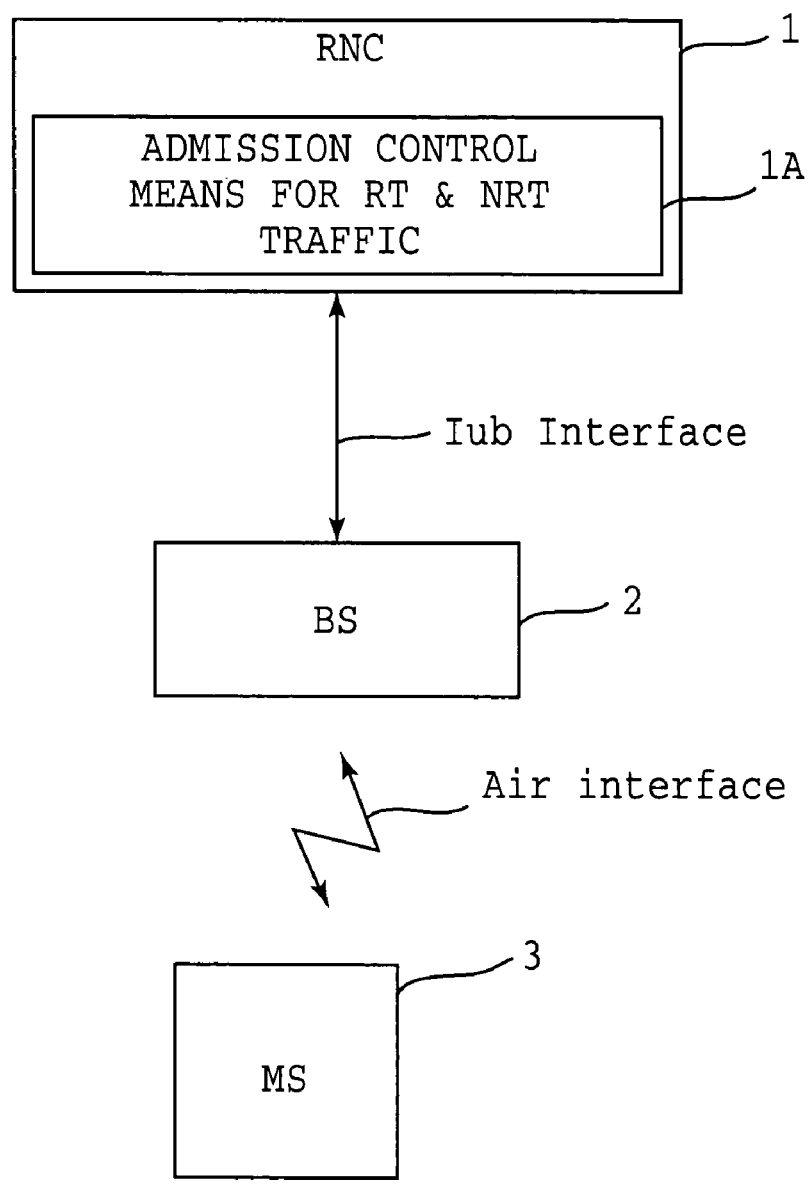
FIG. 1 depicts a general block circuit diagram of a radio access network as a part of a radio telecommunication network.

The present invention will subsequently be described in detail with reference to the drawings.

The starting point of the present invention is that the physical resources of the radio access network are not reserved on a data packet basis by using special channel activation/deactivation procedures.

Instead, the principle underlying the present invention resides in that the physical resources of the radio access network for data packet transmission via the Iub interface and via a respective base station BS are reserved dynamically according to the prevailing need of transmission resources for the real time traffic components on a channel element basis. This means that real time traffic is allocated all the radio resources required and that non-real time traffic is allocated the remaining radio resources of the entire available resources.

This allocation and/or partitioning of available resources is performed dynamically, i.e. after an initial partitioning, the procedure is repeatedly performed to update the partitioned resources periodically, i.e. on the condition that a predetermined period of time has lapsed as an update condition. Alternatively, updating can be performed dependent on the occurrence of another specified update condition like for example a new real time RT bearer entering the radio network and requiring radio resources or any bearer (RT or NRT) leaving the network.

The thus partitioned physical transmission resources are reserved for the RT and/or NRT traffic components on a channel element basis. Stated in other words, a respective bearer channel (defined e.g. by carrier frequency, time slot (in TD-WCDMA) and channelization code) is further divided in channel elements. This means, that a respective channel used for transmission according to an adopted asynchronous transmission mode ATM consists of a plurality of virtual paths VP denoted by virtual path identifiers VPI, and each virtual path as such comprises a plurality of virtual channels VC denoted by virtual channel identifiers VCI. Upon partitioning the physical resources, the real time traffic is allocated a certain required number of the virtual paths and/or virtual channels, while the non-real time traffic is allocated the remaining resources, i.e. the remaining virtual channels and/or virtual paths.

The following description of the flowcharts shown in FIGS. 2 to 4 will explain the above in greater detail.

In FIG. 2, the method according to the present invention which is implemented in the radio network controller device RNC (shown in FIG. 1) starts in a step S0.

In a subsequent step S1, a subroutine is activated for initially partitioning the physical resources of the radio access network. The respective steps performed by this subroutine are illustrated in FIG. 3.

As shown in FIG. 3, the initialization of the resource partitioning is started in a step S10.

In a subsequent step S11 the radio network controller device RNC obtains information regarding the entire available physical transmission resources for real time and non-real time traffic components of a respective radio transceiver device (base station). This can be achieved in that the radio network controller device RNC requests a respective base station to report its physical transmission resources (via Iub interface). Alternatively, the radio network controller device RNC already keeps a record of the entire physical transmission resources of each respective base station controlled by the radio network controlling device RNC, which would alleviate the need for a requesting and reporting procedure.

Then, in a step S12, the radio network controlling device RNC obtains a knowledge of a value for expected real time traffic in the network as regards a subject base station BS. Also this value can be a fixed and predetermined value that is the same for all base stations and known to the radio network controller device RNC beforehand. Alternatively, this information can be obtained as a result of a requesting (RNC side) and reporting (BS side) procedure, during which a subject base station BS informs the radio network controller device RNC of the real time traffic expected for itself. This may be a predetermined value for a respective base station which differs from base station to base station according to the location of the base station (e.g. urban terrain or rural area). As a further alternative, the expected RT traffic amount may be set to a fixed percentage of the previously obtained entire traffic resources of the base station (for example to a value of 50%).

Then, in a following step S13, the transmission resources are initially partitioned. This means that transmission resources for the non-real time traffic are reserved based on the knowledge of the overall available transmission resources of a radio transceiver device (base station BS) of said radio access network and the information related to the transmission resources required for handling real time traffic by said base station. More precisely, the difference between the entire available transmission resources at a respective base station BS and the resources required for expected real-time traffic volume at said respective base station are defined as the reserved resources for non-real time traffic at said respective base station BS.

The subroutine of initialization then advances to a step S14. In step S14, an update period is set thereby defining an update condition, and a corresponding timing device or timer (e.g. clocked counter with a fixed clock period) for detecting the lapse of said update period is reset (reset of an update condition flag). This step is performed in the example case described that a lapse of an update period is defined as an update condition mentioned above. However, it is also conceivable to use this step to define the update condition as such, i.e. whether lapse of a time period or entering of RT bearers or/leaving of NRT/RT bearers is defined as an update condition. In the latter case, a corresponding update condition flag would then have to be reset.

The initialization subroutine terminates in a step S15 ("exit") and returns to the flowchart illustrated in FIG. 2.

As shown in FIG. 2, the method proceeds with a step S2. In step S2, the previously partitioned physical resources are allocated to the respective real time as well as non-real time traffic handled by a subject base station of the radio network. The allocation is performed on a per channel element basis which is explained herein after in more detail.

Each of a plurality of channels available at a respective base station is operated in an asynchronous transmission mode ATM. In such a transmission mode, each channel comprises a plurality of channel elements of so-called virtual paths VP which are identified by so-called virtual path identifiers VPI. Each virtual path, in turn, comprises plural so-called virtual channels VC which are identified by so-called virtual channel identifiers VCI.

Assuming an example case of a base station BS having two channels (CH1 & CH2), each channel comprising three virtual paths VP (identified by VPI_1 to VPI_3, and VPI_4 to VPI_6, respectively), each virtual path VP comprising three virtual channels VC (identified by VCI_1 to VCI_9 and VCI_10 to VCI_18, respectively). Then, a RT/NRT resource partition of the transmission resources may be such that virtual paths VP identified by VPI_1 to VPI_5 are dedicated for real time RT traffic, while virtual path VPI_6 is dedicated for non-real time NRT traffic. Also, a partition is possible in which resources are partitioned in units of virtual channels. For example, the virtual channels VC denoted by VCI_1 to VCI_14 are dedicated for RT traffic transmission while virtual channels denoted by VCI_15 to VCI_18 are dedicated to non-real time traffic transmission.

Thus, the resources which have been partitioned in the above illustrated manner, are allocated to currently prevailing traffic by the radio network controller RNC, which informs the base station of the identity of the traffic itself. This can be done by referring to the transmission format and/or used codes. The radio network controller then addresses and/or selects the respective channel element (virtual channel/virtual path) by selecting the dedicated (reserved) virtual channel elements (VC, VP) for the RT/NRT traffic currently to be handled, and the transmission is effected using the thus allocated channel elements.

Subsequently, in a step S3, it is checked whether an update condition has occurred. This means that in case of a periodical update after the lapse of an update period as an update condition, the timing device is checked to detect whether the update period has already lapsed. However, as mentioned above, it is also possible to check in step S3 for the occurrence of another update condition like for example entering of RT bearers or leaving of some bearers (RT and/or NRT).

If the update period is not over (NO in step S3), or, more generally, if the update condition has not occurred, the flow returns to step S2. This means that the traffic is handled by allocating traffic to the channel elements using the previous (and/or initial) resource partitioning.

If, however, the update period has lapsed (YES in step S3), or, more generally, if the update condition has occurred, the method flow advances to a step S4. In step S4, the resource partitioning is updated. Such an update procedure can be effected using for example the Frame Control Layer FCL. When thus updating the resource partitioning, the base station BS can be informed about all NRT bearers which are active and inactive under the radio network the subject base station BS is covering. Also, the base station can be informed about all RT bearers, if variable bit rate VBR is desired to be used effectively from the point of view of transmission resources. Then, the frame control layer FCL can be used later on just to point to the predetermined bearer information in the base station BS to achieve a "fast channel activation/deactivation".

The updating subroutine will be described in greater detail with reference to FIG. 4.

As illustrated in FIG. 4, the updating subroutine starts in a step S40.

Thereafter, in a step S41, the current real-time traffic volume is detected. For example, the base station reports to the radio network controller the number of ongoing phone calls on the basis of which the current real-time traffic can be derived. This is in a way comparable to step S12 in FIG. 3, while, however, the detected value for real time traffic volume reflects the actual current need for radio resources for transmission.

In a following step S42, the radio resource partitioning is updated. Namely, the new resources available for NRT traffic are defined as the difference between the entire available resources at a respective base station (as obtained in step S11) and the resources required for the currently detected RT traffic volume.

By allocating all resources required for real time transmission to the real time traffic, real-time traffic is preferred to non-real time traffic. The non-real time traffic may use only those resources which are not required by the real time traffic.

Subsequently, the update period timer (or generally spoken, the update condition flag) is reset in a step S43, and the subroutine ends in a step S44 ("exit") and returns to the flowchart illustrated in FIG. 2.

As illustrated in FIG. 2, after updating, the flow returns to step S2. This means, that in the following the newly partitioned resources are used to be allocated to respective traffic components, as described already herein above, and an updating of the partitioned resources is effected each time the update condition has occurred, e.g. each time the update period has lapsed.

It has to be noted that in case of updating performed each time a RT bearer enters or leaves the radio network, also the processing load of the RNC side could be reduced.

Moreover, apart from the above update conditions (i.e. entering/leaving of bearers or lapse of an update period), other conditions are conceivable to be implemented. For example, it could be checked in step S3 whether a predetermined time of a day has been reached like for example 10:00 p.m. in the evening. Namely, it could be expected that during night, real time traffic will reduce since subscribers to the network will sleep, while however non-real time traffic such as (scheduled) transmission of files will increase due to somewhat decreased charges for using the network at night. Therefore, performing a forced update of resource partitions at specified times of the day is also advantageously conceivable.

As described above, the present invention proposes a method for controlling transmission resources of a radio access network adapted to transmit data packets in real time traffic and in non-real time traffic, the method comprising the steps of obtaining information related to transmission resources required for handling real time traffic; and reserving transmission resources for handling non-real time traffic based on a knowledge of the overall available transmission resources of a radio transceiver device of said radio access network and the information related to the transmission resources required for handling real time traffic by said radio transceiver. Transmission resources are subsequently activated based on channel elements which are identified by pre-selected channel identifiers. This alleviates the use of hitherto required time consuming channel activation procedures as well as the need to refer to any bearer information.

It should be understood that the above description and accompanying figures are merely intended to illustrate the present invention by way of example only. The preferred embodiments of the present invention may thus vary within the scope of the attached claims.

The invention claimed is:

1. A method for controlling transmission resources of a radio access network adapted to transmit data packets in real-time traffic and in non-real time traffic, wherein the transmission resources are controlled on an interface between a radio network controller and at least one radio transceiver device of said radio access network being controlled by said radio network controller, the method comprising the steps of:

obtaining information in the radio network controller, related to transmission resources of the radio transceiver devices, said information indicating the transmission resources required for handling real time traffic in the radio transceiver device;

reserving transmission resources for handling non-real time traffic dynamically based on a knowledge of overall available transmission resources of a respective radio transceiver device of said radio access network and the information related to the transmission resources required for handling real time traffic by said respective radio transceiver, wherein the respectively reserved transmission resources are distinguished on the basis of ATM virtual path identifiers and virtual channel identifiers, wherein the reserving step preselects the transmission resources for the respective radio transceiver device; and transmitting prevailing traffic based on an identity of the traffic to be handled by selectively addressing the ATM virtual path identifiers and virtual channel identifiers for the real time/non-real time traffic to be handled.

2. A method according to claim 1, wherein said reserving of transmission resources for handling non-real time traffic resides in determining the difference between the overall available transmission resources of said radio transceiver device of said radio access network and the transmission resources required for handling real time traffic, wherein said difference is the reserved transmission resources for the non-real time traffic.

3. A method according to claim 1, wherein said step of obtaining and reserving is carried out repeatedly upon occurrence of an update condition.

4. A method according to claim 3, wherein said update condition resides in the lapse of an update period.

5. A method according to claim 3, wherein said update condition resides in an entering of a RT bearer to the radio network or the leaving of an RT and/or NRT bearer from the network.

6. A method according to claim 3, wherein said update condition resides in that a predetermined time of a day is reached.

7. A method according to claim 3, wherein in a very first obtaining step, a predetermined value for the transmission resources required for handling real time traffic is used, and in all subsequent obtaining steps, a detected value of the actually required transmission resources for handling real time traffic is used.

8. A method according to claim 1, further comprising:

wherein in the step of obtaining information, the information is obtained by the radio network controller.

9. A radio access network control device, configured to:

obtain information in a radio network controller related to transmission resources of at least one radio transceiver device, said information indicating the transmission resources required for handling real time traffic;

reserve transmission resources for handling non-real time traffic dynamically based on a knowledge of overall available transmission resources of a respective radio transceiver device of said radio access network and the information related to the transmission resources required for handling real time traffic by said respective radio transceiver, wherein the respectively reserved transmission resources are distinguished on the basis of ATM virtual path identifiers and virtual channel identifiers, and reserved by preselecting the transmission resources for the respective radio transceiver device; and transmit prevailing traffic based on an identity of the traffic to be handled by selectively addressing the ATM virtual path identifiers and virtual channel identifiers for the real time/non-real time traffic to be handled.

10. A radio access network control device according to claim 9, further configured to:

obtain information related to transmission resources required for handling real time traffic in a radio network controller, wherein the information is obtained by the radio network controller.

11. A radio access network control device comprising:

obtaining means in a radio network controller for obtaining information related to transmission resources of at least one radio transceiver device, said information indicating the transmission resources required for handling real time traffic;

reserving means for reserving transmission resources for handling non-real time traffic dynamically based on a knowledge of overall available transmission resources of a respective radio transceiver device of said radio access network and the information related to the transmission resources required for handling real time traffic by the said respective radio transceiver, wherein the respectively reserved transmission resources are distinguished on the basis of ATM virtual path identifiers and virtual channel identifiers; and transmitting means for transmitting resources for the respective radio transceiver device, and to transmit prevailing traffic based on an identity of the traffic to be handled by selectively addressing the ATM virtual path identifiers and virtual channel identifiers for the real time/non-real time traffic to be handled.

12. A radio access network control device according to claim 11, further comprising:

wherein in the obtaining means for obtaining information related to transmission resources required for handling real time traffic in a radio network controller, the information is obtained by the radio network controller.

13. A radio transceiver device, configured to:

receive, from a radio access network control device, information relating to reserved transmission resources of at least one radio transceiver devices, said information indicating the transmission resources required for handling non-real time traffic and for handling real time traffic, wherein the respectively reserved transmission resources are distinguished on the basis of ATM virtual path identifiers and virtual channel identifiers, use the reserved transmission resources for transmission, based on the ATM virtual path identifiers and virtual channel identifiers, by allocating respective traffic to corresponding channel elements distinguished on the basis of ATM virtual path identifiers and virtual channel identifiers, reserve by preselecting the transmission resources for the respective radio transceiver device, and transmit prevailing traffic based on an identity of the traffic to be handled by selectively addressing the ATM virtual path identifiers and virtual channel identifiers for the real time/non-real time traffic to be handled.

* * * * *